Nov. 8, 1966 H. MORRISON ETAL 3,284,151

INSTRUMENT CABINETS

Filed Nov. 6, 1964 3 Sheets-Sheet 1

WITNESS

*INVENTORS.*
Herbert Morrison,
Paul O. Rawson and
George L. Schick.
BY
ATTORNEY

INVENTORS.
Herbert Morrison,
Paul O. Rawson and
George L. Schick.

3,284,151
Patented Nov. 8, 1966

3,284,151
INSTRUMENT CABINETS
Herbert Morrison and Paul O. Rawson, Trumbull, and George L. Schick, Georgetown, Conn., assignors, by mesne assignments, to The Singer Company, New York, N.Y., a corporation of New Jersey
Filed Nov. 6, 1964, Ser. No. 409,495
8 Claims. (Cl. 312—244)

This invention relates to cabinets and more particularly to cabinets for instruments containing electronic equipment.

In the design of cabinets, for this type of equipment, facility of insertion and removal of the equipment housed therein combined with proper ventilation, rugged mechanical characteristics, satisfactory means for handling, and facility of positioning of the equipment at an appropriate angle for visibility of indicating dials, screens and indicia thereon, are objectives of primary importance. The efficiency with which such instruments must be employed in production, defense, and research applications require that convenience of use and reliable operation of equipment combined with short servicing time must be possible.

As many such instruments are to be housed in racks or consoles, it is desirable that the cabinet be readily separable from the instrument chassis in order to avoid the necessity of changing the structure of the chassis when it is to be moved from a cabinet to a rack.

In aditdion, instrument cabinets frequently require considerable effort in connection with alignment of the chassis and parts upon assembly of the instrument into the cabinet, thereby causing injury to personnel and damage to sensitive parts of the instrument. Hence, it is desirable that a cabinet for an electronic instrument be do designed as to facilitate assembly and minimize accidents.

During assembly, testing and repair of highly sensitive and accurate equipment it may be necessary to remove the cabinet to permit access to the top, sides, and bottom of the instrument. In the past such operations have been complicated by cabinets which were difficult to remove from the instrument. Hence, facility of removal of the cabinet or portions of it is highly desirable, as such removal may be required repeatedly.

In order that a portable instrument may be supported at a convenient angle for viewing the front panel, indicia, dials, etc., it is desirable that a convertible support be provided in order that the instrument can be conveniently used, moved and stored. The support should be both rugged and easy to use.

For convenience of use of a portable instrument having an electrical cord which is employed for connection to an electrical wall receptacle it is desirable to provide a cord holder located in a convenient position for storage in which it may be protected from damage. It is also desirable that the cord holder should not project from the instrument in order to prevent damage to other objects or personnel when the cabinet is moved.

It is also desirable that a portable instrument cabinet be provided with convenient handles or the like which will not interfere with the operator when not being employed for carrying the instrument.

In accordance with this invention a cabinet for instruments is provided comprising a top member, a bottom member, and a back member. The top member comprises a top and two upper side sections. The bottom member comprises a bottom and two lower side sections. The back member comprises a back and two intermediate side sections. The six side sections form the left and right sides of the cabinet.

Further in accordance with this invention the cabinet is provided with handles housed in recesses in the sides of the cabinet.

In another aspect of this invention the back member includes a rim extending backwardly from the rear face of the back member to define a recess. On the back face a cord holder is mounted within that recess.

In still another aspect of this invention a novel support is provided for an instrument cabinet including a pair of channel bars fastened to the bottom of the cabinet extending parallel to one another. A U-shaped stand is rotatably mounted between the ribs of the channel bar. Each of the channel bars is provided with one of a pair of confronting slots located for alignment with the transverse portion of the U-shaped stand when it is retracted with its legs within the channels defined by the channel bars.

Further aspects of this invention are described below with reference to a specific embodiment of this invention illustrated by the appended drawings in which.

Figure 1:
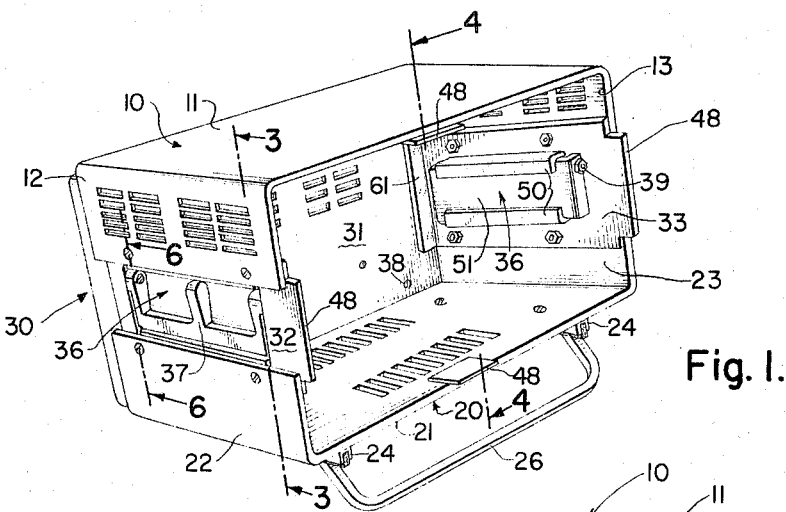
FIG. 1 shows a front perspective view of a cabinet incorporating the present invention.
Figure 2:
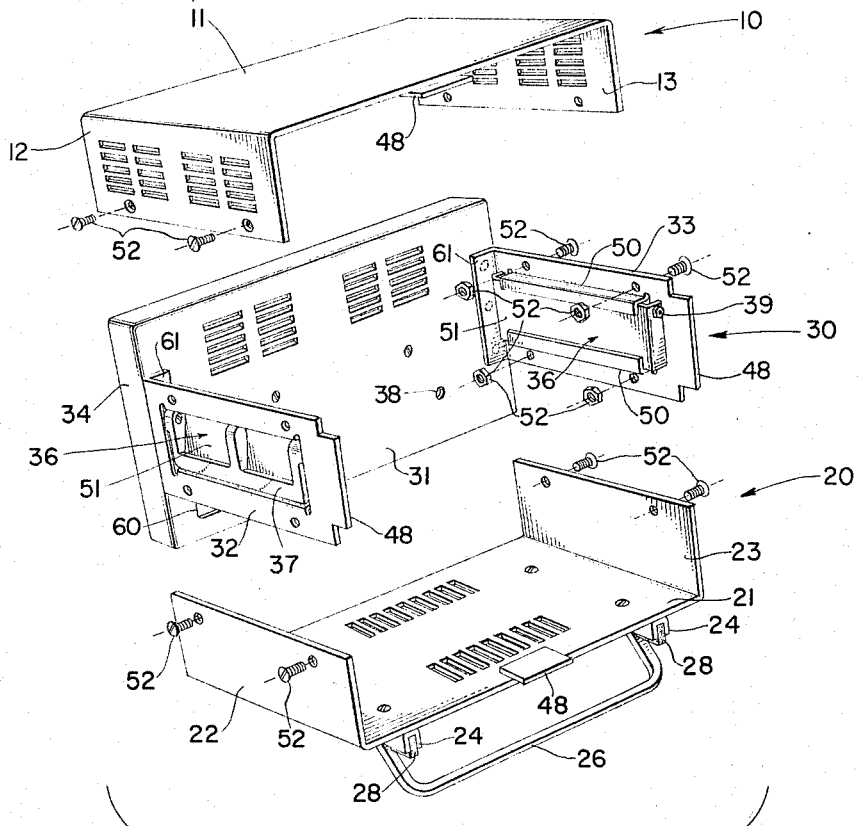
FIG. 2 is a partially exploded perspective view of the cabinet shown in FIG. 1.

Referring to FIGS. 1 and 2, the cabinet includes a top member 10, a bottom member 20, a back member 30, each of which is generally U-shaped.

The top member 10 comprises a rectangular piece with the lateral ends thereof bent downwardly at a right angle to form a top 11, a first side section 12 forming a portion of the left side of the cabinet and a second side section 13 forming a portion of the right side of the cabinet, each side section having ventilation openings.

Figure 4:
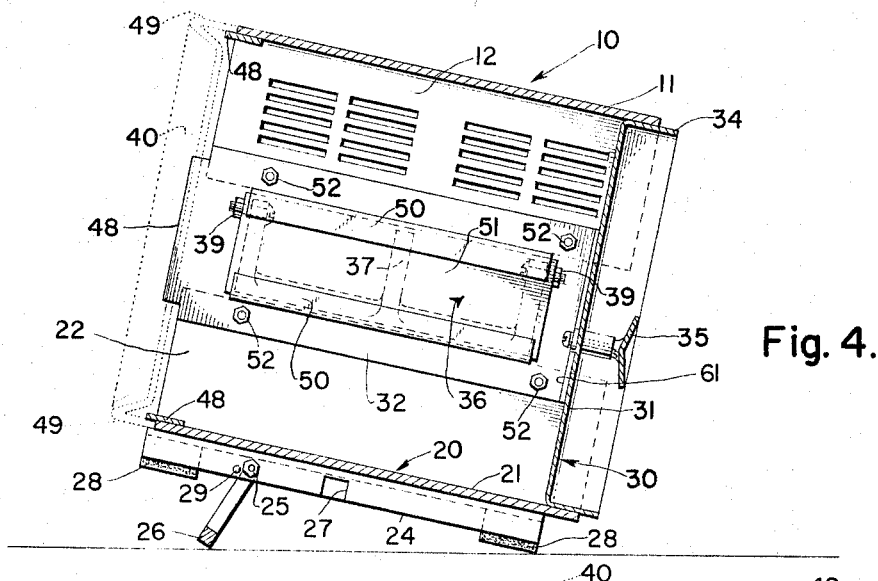
FIG. 4 is a right sectional elevation of the cabinet taken generally along line 4—4 in FIG. 1.
Figure 5:
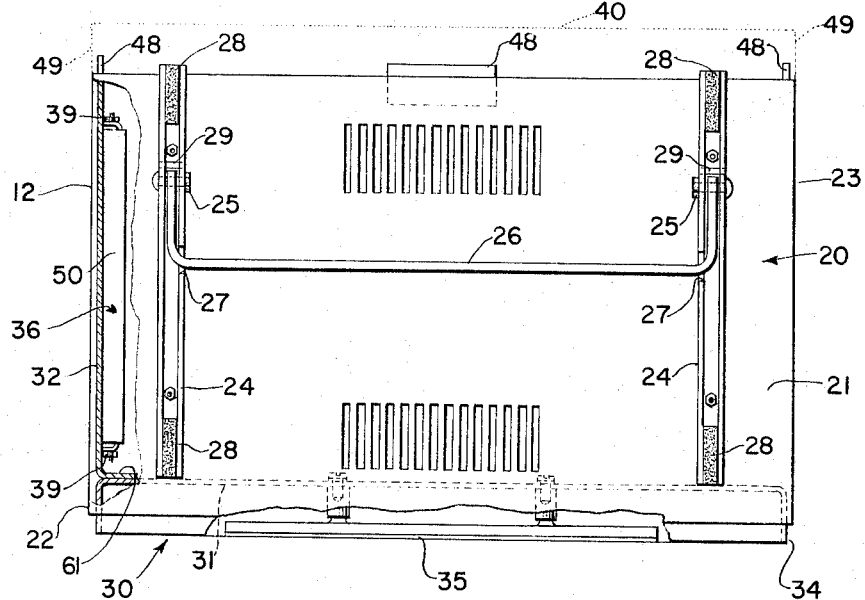
FIG. 5 is a bottom plan view of the cabinet shown in FIG. 1 with the stand retracted and portions of the left side and back cut-away and sectioned for convenience of illustration.

The bottom member 20 is generally similar in shape to the top member 10 but is inverted and the ventilation openings are located in a different surface. The bottom member 20 is generally rectangular with lateral ends thereof bent upwardly to form a bottom 21, a third side section 22 (left side) and a fourth side section 23 (right side). In FIG. 5 a pair of channel bars 24, i.e. bars of U-shaped cross-section, are shown affixed by screws and nuts to the exterior of the bottom 21 extending from the front to the back thereof with the ribs of channel bars 24 extending downwardly. A pair of fasteners (nuts and bolts) 25 through the bars 24 pivotally mount a U-shaped stand 26, shown extended in FIGS. 1, 2 and 4. The legs of stand 26 may be retracted as shown in FIG. 5, within the channels of the bars 24, with the transverse portion of stand 26 passing through a pair of slots 27 in the inner rib surfaces of the bars 24, as illustrated in FIGS. 4 and 5. Located forwardly of each of the fasteners 25 and adjacent to them is a stop pin 29 extending across the channel and affixed to the ribs of each of the bars 24. Pins 29 are employed to retain the stand 26 in a predetermined extended position for supporting the cabinet at a predetermined angle suitable for facilitation of viewing indicia and indicators which may be located on the front surface of the cabinet.

The channel bars 24 are preferably fitted with four pads 28 which are composed preferably of resilient material, such as rubber and the like, and are located adjacent to the opposite ends of the channel bars 24.

Figure 3:
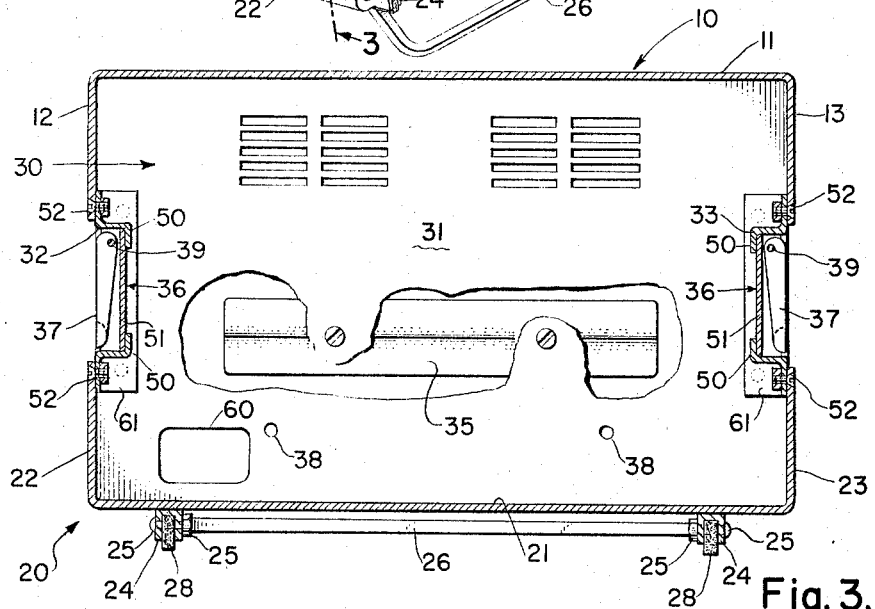
FIG. 3 is a front sectional elevation of the cabinet taken generally along line 3—3 in FIG. 1, with the stand retracted, and a portion of the back cut-away for convenience of illustration.

The back member 30 is composed in general of a back 31, and fifth and sixth side sections 32 and 33 on the left and right sides of the cabinet, respectively. The fifth and sixth side sections 32 and 33 are substantially integral with the back 31 and in this case each is secured thereto by means of an inturned flange 61 bent to extend inwardly from the back edges of the side sections 32 and 33 as best seen in FIGS. 1, 2 and 3. Each flange 61 is secured to the back 31 by spot welding or the like.

About the periphery of the back 31, which is rectangular in shape, is a rim 34 (FIGS. 2, 4 and 5) extending to the rear, normal to the flat surface of the back 31. A cable holder 35 is affixed to the rear of the back 31 located within the recess formed by the peripheral rim 34.

Figure 6:
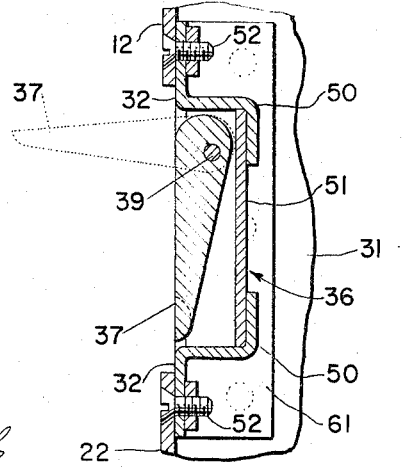
FIG. 6 is a fragmentary sectional front elevation view of the left side of the cabinet illustrating a handle extendably housed in a recess taken generally along line 6—6 in FIG. 1, with the handle shown extended in phantom and retracted in the full line position.

In the fifth and sixth side sections 32 and 33 are included a pair of recessed members 36, each having a recess for housing one of a pair of handles 37. Each handle 37 is pivotally mounted by a pair of fasteners 39 (screws and nuts) secured through corresponding holes in the handle 37 and the corresponding recessed member 36. The handles 37 may be retracted within the recesses in the recessed members 36 as in FIGS. 1, 2, 3 and 6 or may be extended as shown in phantom in FIG. 6.

The recessed members 36 shown are preferably formed by making a rectangular aperture in the fifth and sixth side sections 32, 33 with vertical slots in those side sections extending along the vertical edges of the apertures above and below them to permit bending the portions of the side sections above and below the apertures inwardly to form flanges 50 in the shape of a pair of opposed, laterally elongated right angle brackets. One of a pair of U-shaped pltaes 51 having the front and back ends thereof bent outwardly towards the adjacent surfaces of the fifth or sixth side sections, 32, 33, is secured to the flanges 50 preferably by means of spot welding to form a rigid structure. The fasteners 39 are thus supported by means of attachment to the ends of the plates 51 as shown in FIGS. 1, 2 and 4.

The back member 30 is supported on the bottom member 20 by means of several fasteners 52 (screws and nuts) securing the fifth and sixth side section 32 and 33 to the third and fourth side sections 22 and 23, respectively. The rim 34 of the back member 30 may rest in mating contact with the rear edge of the bottom 21 (FIG. 4) and the third and fourth side sections 22, 23.

The top member 10 is supported by securing its side sections 12, 13 to the side sections 32, 33 of the back member 30 by means of additional fasteners 52 (screws and nuts) with the first and fifth side sections 12 and 32, and the second and sixth side sections 13 and 33, repectively, fastened together. The top 11 and the first and second side sections 12 and 13 preferably mate near the rear edges thereof with the rim 34 (FIGS. 1, 4 and 5).

The cabinet described above is adapted to house an instrument mounted on a chassis and to that end a pair of apertures 38 in the back 31 are adapted to receive screws for securing such a chassis in the cabinet. In FIGS. 4 and 5 a bezel 40 having a rectangular rim 49 is shown in phantom. Each of the top 11, the bottom 21, and the fifth and sixth side sections 32 and 33 has a guide strip 48 extending therefrom to engage with the inner surface of the rim 49 to hold the bezel 40 which may be affixed to an instrument chassis (not shown) thereby rigidly supporting such a chassis within the cabinet, as will be understood by those skilled in the art.

By employing the above method of securing an instrument chassis in the cabinet, i.e. by fastening it with screws inserted through the apertures 38, a chassis and the bezel 40 can be removed from the cabinet simply by removing two screws.

Connection of power to the chassis may be made through an aperture 60 in the back 31 (shown in the lower left corner thereof in FIGS. 2 and 3).

Having thus described the nature of the invention, what we claim herein is:

1. A cabinet for instruments including three U-shaped members, a first one of said U-shaped members comprising a top having a first pair of side sections extending downwardly from said top, a second one of said U-shaped members comprising a back having a second pair of side sections extending forwardly from said back, said back having a substantially greater height than said second pair of side sections, and a third one of said U-shaped members comprising a bottom having a third pair of side sections extending upwardly from said bottom, the lower surface of each of said first pair of side sections overlapping and being fastened respectively to the upper surface of one of said second pair of side sections, the upper surface of each of said third pair of side sections overlapping and being fastened respectively to the lower surface of one of said second pair of side sections, said first, second, and third pairs of side sections forming the sides of said cabinet.

2. A cabinet in accordance with claim 1, in which said back member includes a rim extending backwardly from the rear face of said back member to define a recess, and a cord holder affixed to the rear face of said back member and located within said recess said top and said first pair of side sections and said bottom and said third pair of side sections overlapping said rim in mating contact therewith.

3. A cabinet in accordance with claim 1, in which said fifth and sixth side sections each includes one of a pair of recessed members defining a recess therein, said recessed members extending into the interior of said cabinet, a pull handle being rotatably mounted on each said recessed member for extension exteriorly of said member and for retraction within said member.

4. A support for a cabinet comprising a pair of channel bars affixed to the base of said cabinet, said channel bars being disposed in parallel relationship, a U-shaped stand, the ends of said stand being rotatably mounted on fasteners between the ribs of said channel bars, a slot in each of the inner ribs of said channel bars located for alignment with the transverse portion of said U-shaped stand during retraction thereof, with the legs of said stand retracted within said channel bars.

5. A stand in accordance with claim 4 with said channel bars having a stop member extending transversely thereof adjacent to the ends of said legs and forwardly of said fasteners.

6. A stand in accordance with claim 4, with a plurality of resilient feet secured adjacent the ends of said channel bars.

7. A cabinet for instruments comprising a top member, a bottom member and a back member, said top member comprising a top and first and second side sections, said bottom member comprising a bottom and third and fourth side sections, said back member comprising a back and fifth and sixth side sections, all of said side sections forming the sides of said cabinet, said bottom member including a support comprising a pair of channel bars including a pair of parallel ribs affixed to said bottom and extending in parallel relation, feet mounted in said channel bars, a U-shaped stand having the ends thereof rotatably mounted between th e ribs of said channel bars, and a slot in each of the inner surfaces of said ribs of said channel bars located for alignment with the transverse portion of said U-shaped stand when in a retracted position partially within said channel bars.

8. A cabinet for instruments comprising a top member, a bottom member and a back member, said top member comprising a top and first and second side sections, said bottom members comprising a bottom and third and fourth side sections, said back member comprising a back and fifth and sixth side sections, all of said side sections forming the sides of said cabinet, said back member including a rim extending backwardly from the rear face of said back member to define a recess, a cord holder affixed to the rear face of said back member and located within said recess, each of said fifth and sixth side sections including one of a pair of recessed members defining a recess therein, said recessed members extending into the interior of said cabinet, and a pull handle being rotatably mounted on each said recessed member for extension exteriorly of said member and for retraction within said member.

References Cited by the Examiner

UNITED STATES PATENTS

| | | | |
|---|---|---|---|
| 1,934,035 | 11/1933 | Canedy | 16—126 |
| 2,115,720 | 5/1938 | Holmes | 312—257 X |
| 2,622,952 | 12/1952 | Wilhide | 312—280 |
| 2,798,781 | 7/1957 | Anderson | 220—4 X |
| 2,902,328 | 9/1959 | Auer | 312—257 X |

CLAUDE A. LE ROY, *Primary Examiner.*

CHANCELLOR E. HARRIS, *Examiner.*

F. DOMOTOR, *Assistant Examiner.*